No. 655,081.　　　　　　　　　　　　　　　　　Patented July 31, 1900.
W. M. HENSON.
KITCHEN CABINET.
(Application filed Nov. 16, 1899.)
(No Model.)　　　　　　　　　　　　　　　　　　2 Sheets—Sheet 1.
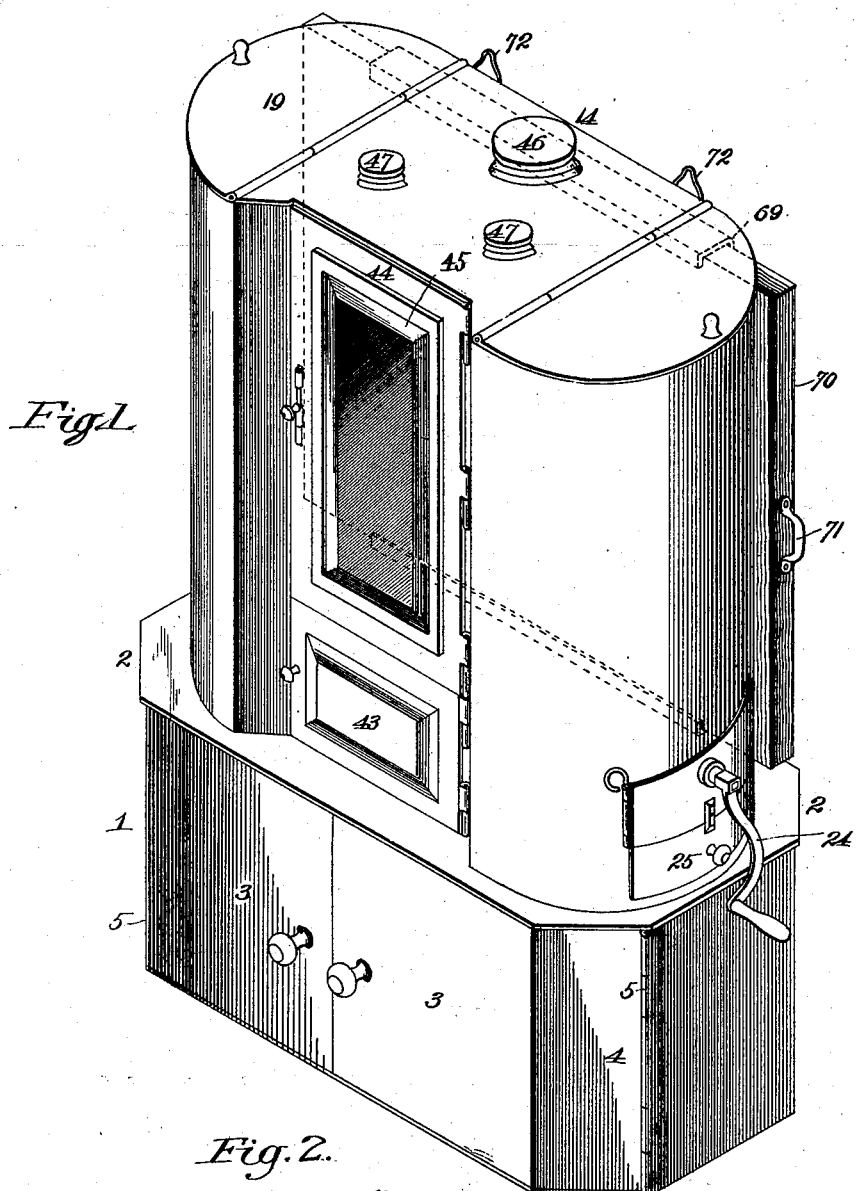

No. 655,081. Patented July 31, 1900.
W. M. HENSON.
KITCHEN CABINET.
(Application filed Nov. 16, 1899.)

(No Model.) 2 Sheets—Sheet 2.

Witnesses,
R. E. Riley
H. C. Rodgers

Inventor,
Wm. M. Henson.
By Fischer & Thorpe Attys.

UNITED STATES PATENT OFFICE.

WILLIAM M. HENSON, OF KANSAS CITY, MISSOURI.

KITCHEN-CABINET.

SPECIFICATION forming part of Letters Patent No. 655,081, dated July 31, 1900.

Application filed November 16, 1899. Serial No. 737,177. (No model.)

*To all whom it may concern:*

Be it known that I, WILLIAM M. HENSON, a citizen of the United States, and a resident of Kansas City, in the county of Jackson and State of Missouri, have invented a new and useful Kitchen-Cabinet, of which the following is a specification.

My invention relates to kitchen-cabinets, and has for one object the provision of a device of this character wherein may be stored with convenient accessibility and protected from dust, moisture, and vermin the most essential ingredients for the cooking and seasoning of food, flour, meal, coffee, sugar, bread, cake, &c., and from which such substances may be extracted in the desired quantities.

A further object is to provide a cabinet having a detachable bread-board conveniently supported and efficient sifting mechanism, which may be quickly and easily removed for cleansing and repair purposes.

A still further object is to produce a cabinet of strong, durable, compact, and ornamental construction.

With these objects in view the invention consists in certain novel and peculiar features of construction and combinations of parts, as hereinafter described and claimed, and in order that it may be fully understood reference is to be had to the accompanying drawings, in which—

Figure 4:
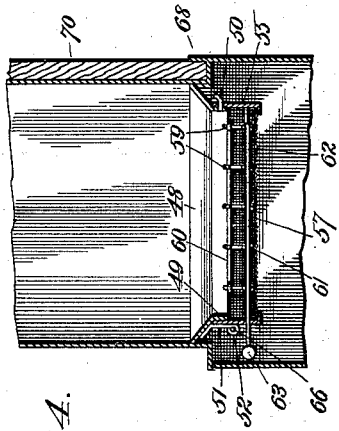
Figure 3:
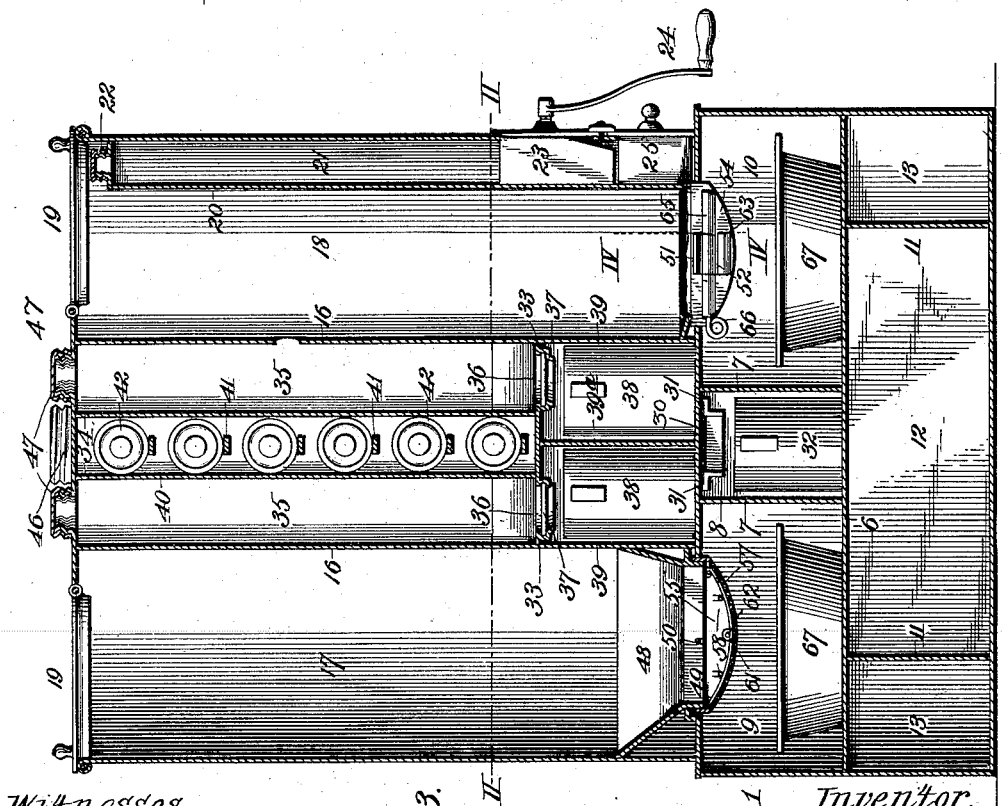

Figure 1 represents a perspective view of a kitchen-cabinet embodying my invention. Fig. 2 is a horizontal section taken on the line II II of Fig. 3. Fig. 3 is a vertical section taken in the direction of the length of the lower or safe portion of the cabinet. Fig. 4 is a vertical section taken on the line IV IV of Fig. 3.

The cabinet comprises a safe or lower portion and an upper or body portion, the former, 1, being of substantially oblong rectangular form and having for purposes of ornamentation its corners mitered, as shown at 2. The entire front of this safe or lower portion is open, being closed normally by the obtuse-angle doors 3, the short arms 4 of said doors when closed coinciding with the mitered ends 2 and being hinged to the ends of the box, as shown at 5. The safe or lower portion is provided with the horizontal partition 6, dividing it into an upper and a lower chamber, the former being subdivided by the vertical partitions 7 to provide the small central chamber 8 and larger end chambers 9 10. The lower chamber is subdivided by vertical partitions 11 to form the larger central chamber 12 and the small end chambers 13, the chamber 12 being designed to receive bread and the chambers 13 cake, &c.

The upper or body portion 14 of the cabinet rests upon the safe or lower portion and is approximately rectangular in plan view, its ends, however, being semicircular in form, so as to correspond approximately with the configuration of the safe or lower portion. The rear side or back of the body portion is straight, while its front side for its full height is paneled or recessed, as shown at 15. The body portion is divided by the vertical partitions 16 into the flour-bin 17 and the meal-bin 18, access to said bins being obtained by opening the semicircular hinged doors 19 at the top.

20 designates a vertical partition within the meal-bin and forming at one side thereof a coffee-bin 21, access for the purpose of charging said bin with coffee being had by opening the proper door 19 in order that a screw-cap 22, closing the upper end of the coffee-bin, may be reached.

23 designates a coffee-mill located in the lower end of the coffee-bin and adapted to be operated by the detachable crank-handle 24, mounted upon its shaft, and below said coffee-mill is a sliding drawer 25 to receive ground coffee.

26 designates a vertical partition extending from the top to the bottom of the body portion and from bin 17 to bin 18 (see Fig. 2) and dividing the space between the bins into a front chamber and a rear chamber, the latter being numbered 27 and having its bottom converging downwardly to an opening 28 therein and the registering opening 29 in the top of the safe or lower portion, the discharge of the contents of said chamber through said openings 28 29 being controlled by a slide 30, arranged below and sliding in cleats 31, secured to the top of the safe or lower portion, a cup or receptacle 32, located in chamber 8, being adapted to receive the discharge when the slide is properly manipulated.

33 designates a horizontal partition at the front of partition 26 and extending from bin 17 to bin 18, (see Fig. 3,) and 34 a pair of vertical partitions (see Fig. 2) partitioning the chamber of which partition 33 is the bottom into the similar chambers or bins 35, (see Figs. 2 and 3,) the contents of said chambers or bins being adapted to be discharged through the openings 36 of the bottom 33 when the controlling-slides 37, Fig. 3, similar in construction and use to slide 31, are properly manipulated. The discharge is received in cups or receptacles 38, situated in chambers 39, formed by centrally partitioning, as at 39ᵃ, the space between the bottom 33 of chambers 35 and the top of the safe or lower portion.

The space 40, Figs. 2 and 3, above chambers 39 and between the chambers 35 has a series of horizontal strips 41, upon which are supported a corresponding number of spice-cans 42 of the construction shown or of any preferred type. The front side of chamber 39 is in the form of a hinged door 43, seated at the base of the recess or paneled portion 15 of the body portion, and vertically above said door and extending from the same to the top of the body portion is a hinged door 44, which forms the outer side of space 40 and hides the spice-cans from view, said door for purposes of ornamentation and use being provided with a panel 45 in the form of a mirror. Access to the interior of bin or chamber 27, Fig. 2, is had through an opening in the top normally closed by a screw-cap 46, and similar screw-caps 47 are used to close openings in the top through which access to bins or chambers 35 is had.

The lower end of bins 17 18 converge downwardly and terminate in annular flanges 49, (see Figs. 3 and 4,) depending through the top of the safe. Upwardly-disposed hooks 50 project from the rear side of flanges 49, (see Figs. 3 and 4,) and plates 51 are secured to the front side of the converging bottoms, by preference terminating at their lower ends in the horizontal eyes or loops 52.

The sifting mechanism for sifting the contents of bins 17 and 18 down into the lower portion of the cabinet is in duplicate, and in order to adapt it to said bins it comprises a rectangular frame 53, having a foraminous bottom 57, and a sifter 58 to work on said bottom, provided with a handle 63, which may be reached conveniently when the doors 3 are open. This sifter-frame is adapted to externally embrace the flange 49 of the bin and is provided with a hole 64 to receive the hook 50 of the bin. (See Fig. 4.) The frame is also provided with a loop 65 to register with eyes or loops 52 and be secured in such position by the slide-rod 66.

In practice the sifting mechanism is secured in or removed from position by an obvious manipulation, and the reciprocation of the agitator by means of the handle 63 when the proper door 3 is opened causes the flour or meal, as the case may be, to descend into the pan 67, one of said pans being located in chamber 9 and the other in chamber 10 of the safe or lower portion.

68 designates a flange projecting upwardly from the rear margin of the safe and parallel with the back of the body portion and 69 an inverted right-angle flange projecting from the top near its upper end, said flanges forming guide-cleats to receive the bread-board 70, provided, by preference, at one side with a handle 71, whereby it may conveniently be slid in and out of position. Above the bread-board the cabinet is provided with a pair of loops 72, by which it may be suspended from hooks secured to the wall or other vertical support, or, if desired, it may with great convenience be supported upon a shelf or table. (Not shown.)

From the above description it will be apparent that I have produced a kitchen-cabinet embodying the various features of advantage enumerated as desirable in the statement of invention, and it is to be understood, of course, that while I have described and illustrated the preferred embodiment of the invention I do not wish to confine myself to this precise construction, form, proportion, or arrangement of the parts, as these may be modified in various particulars without departing from the spirit and scope or sacrificing any of the advantages of the invention.

Having thus described the invention, what I claim as new, and desire to secure by Letters Patent, is—

1. A kitchen-cabinet having its front side or face centrally paneled or recessed, a horizontal partition dividing the cabinet into upper and lower chambers opening into said panel or recess, and a pair of doors one above the other closing the front or uninclosed sides of said chambers and occupying said panel or recess, substantially as described.

2. A kitchen-cabinet having its front side or face centrally paneled or recessed, a horizontal partition dividing the cabinet into upper and lower chambers opening into said panel or recess, and provided with slide-controlled holes, a vertical partition dividing the lower chamber into a pair of chambers communicating with said holes, a pair of vertical partitions dividing the upper chamber into two side chambers 35 registering with the slide-controlled holes, and a central chamber between said side chambers with its front side open or uninclosed and containing can-supporting strips, and a pair of doors one above the other occupying said panel or recess and covering said chambers, substantially as described.

3. In a kitchen-cabinet, the combination with a lower portion provided with receptacle-chambers, and an upper portion comprising a pair of bins communicating with the receptacle-chambers of the lower portion; said upper portion having its front side or face centrally paneled or recessed for its full height, and provided between said bins with superimposed chambers opening into said panel or recess, and a pair of doors occupying said panel or recess and arranged one above the other and forming coverings for the front or uninclosed side of said chambers, substantially as described.

In testimony whereof I affix my signature in the presence of two witnesses.

WILLIAM M. HENSON.

Witnesses:
H. C. RODGERS,
G. Y. THORPE.